No. 667,600. Patented Feb. 5, 1901.
G. H. STEVENS.
MOLDING CELLULOID.
(Application filed July 24, 1900.)
(No Model.)
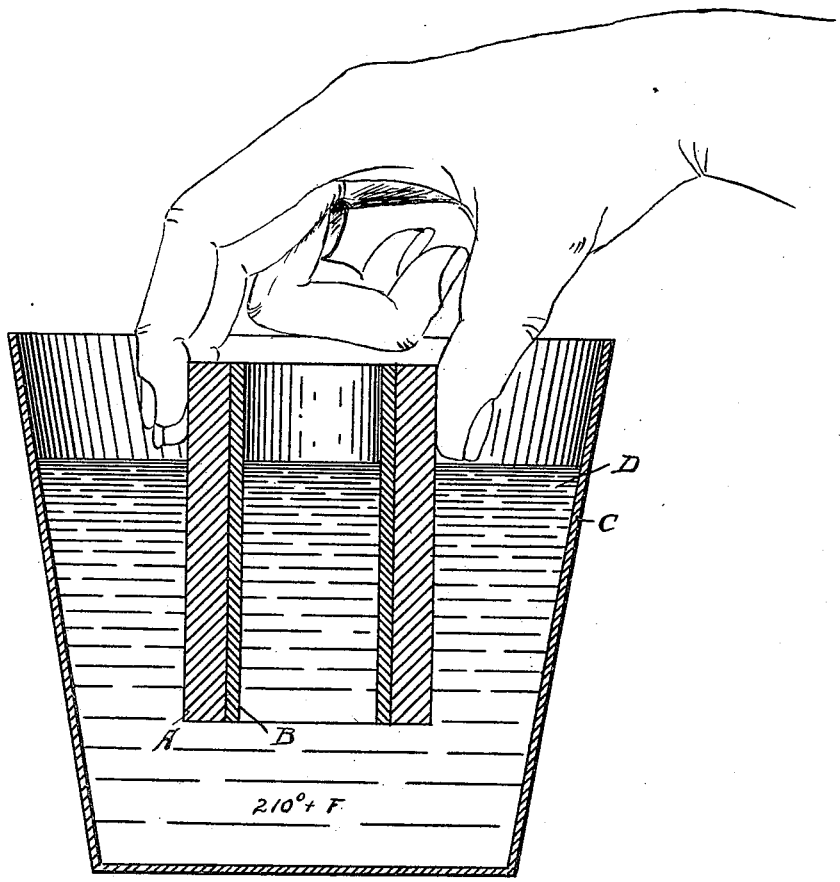
WITNESSES
Chas. E. Wiener
May E. Kott
INVENTOR
George H. Stevens
By Parker & Burton
Attorneys.

UNITED STATES PATENT OFFICE.

GEORGE H. STEVENS, OF TOLEDO, OHIO.

MOLDING CELLULOID.

SPECIFICATION forming part of Letters Patent No. 667,600, dated February 5, 1901.

Application filed July 24, 1900. Serial No. 24,639. (No model.)

*To all whom it may concern:*

Be it known that I, GEORGE H. STEVENS, a citizen of the United States, residing at Toledo, county of Lucas, State of Ohio, have invented a certain new and useful Improvement in Molding Celluloid; and I declare the following to be a full, clear, and exact description of the invention, such as will enable others skilled in the art to which it pertains to make and use the same, reference being had to the accompanying drawing, which forms a part of this specification.

My invention relates to molding celluloid; and the object of my improvement is to provide a process by which celluloid cylinders that have had phonographic records molded or pressed into their outer surfaces by a cylindrical matrix may be withdrawn from said matrix without danger of injuring the record or the matrix.

In the art of reproducing phonographic records an electrotype of a wax record is made. This is in a cylindrical form, with the negative of the record or the matrix upon its interior surface, and is reinforced by a strong surrounding metallic cylinder. A celluloid cylinder of about the diameter of the interior of the matrix is now placed inside of the electrotype and expanded until the record has been impressed upon its outer surface. It is now desirable to withdraw the celluloid cylinder without injuring the delicate record upon it or upon the matrix. I have discovered that if the metal mold, with its inclosed celluloid cylinder, be immersed in water at a temperature close to the boiling-point—say 210° Fahrenheit—the celluloid cylinder will contract in diameter without warping and that the surface will remain true and smooth, one immersion being sufficient to contract a cylinder from one to one and one-fifth inches in diameter as much as one-eighth of an inch.

Referring to the accompanying drawing, A is the cylinder having the negative of the record upon its inner surface.

B is the celluloid cylinder, which has had the indentations pressed into it from the projections on the interior of the matrix, as described, for instance, in United States Letters Patent issued to me for improvements in processes of duplicating phonograms and numbered 650,431.

C is a pail or other receptacle for hot water, and D is the water therein, which should be at about boiling temperature.

I have shown the cylinders as being supported by the hand; but various other methods of supporting the cylinders in the water will occur to any one, and it may be desirable to entirely submerge the cylinders at once. The effect may, however, be produced by placing a part of the cylinders in the water, as illustrated, holding them there a minute or less, and then turning them end for end and placing the other part of the cylinder into the water in the same way.

After removing the cylinders from the water it will be found that the celluloid cylinder is so much smaller than the cylinder A that it may be easily loosened and removed therefrom.

Steam may be used instead of the hot water in fluid form.

The celluloid cylinders I have used are made by being drawn or pressed through a die while in a plastic condition. They are then stretched to the required diameter by being forced over a cylindrical die while still in a plastic condition and allowed to cool and set. It is believed that this mode of manufacture may have an influence in adapting them to contract on being reheated. However, a celluloid cylinder that has not been stretched or expanded in the direction of its diameter will also contract on being heated. The immersion in the water should be for a short time in order that only the requisite amount of contraction may take place, as if the heating is continued too long the cylinder may warp in contracting.

Having fully described my invention, what I claim, and desire to secure by Letters Patent, is—

1. The process of loosening molded celluloid articles from molds consisting in causing the article to contract by subjecting it to the action of hot water, substantially as described.

2. The process of loosening molded cylindrical celluloid phonograms from their molds, consisting in causing said phonograms to contract in the direction of their diameters, by subjecting the same to the action of hot water, substantially as described.

3. The process of loosening molded cylindrical celluloid phonograms from their molds consisting in causing said phonograms to contract in the direction of their diameters, by immersing both the mold and the phonogram therein, in hot water, substantially as described.

4. The process of loosening molded celluloid articles from molds consisting in causing the article to contract by subjecting it to the action of a hot fluid, substantially as described.

5. The process of loosening molded celluloid articles from molds consisting in causing the article to contract by heating it, substantially as described.

In testimony whereof I sign this specification in the presence of two witnesses.

GEORGE H. STEVENS.

Witnesses:
MINNIE KINGSLEY,
W. G. ULERY.